Figure 1:
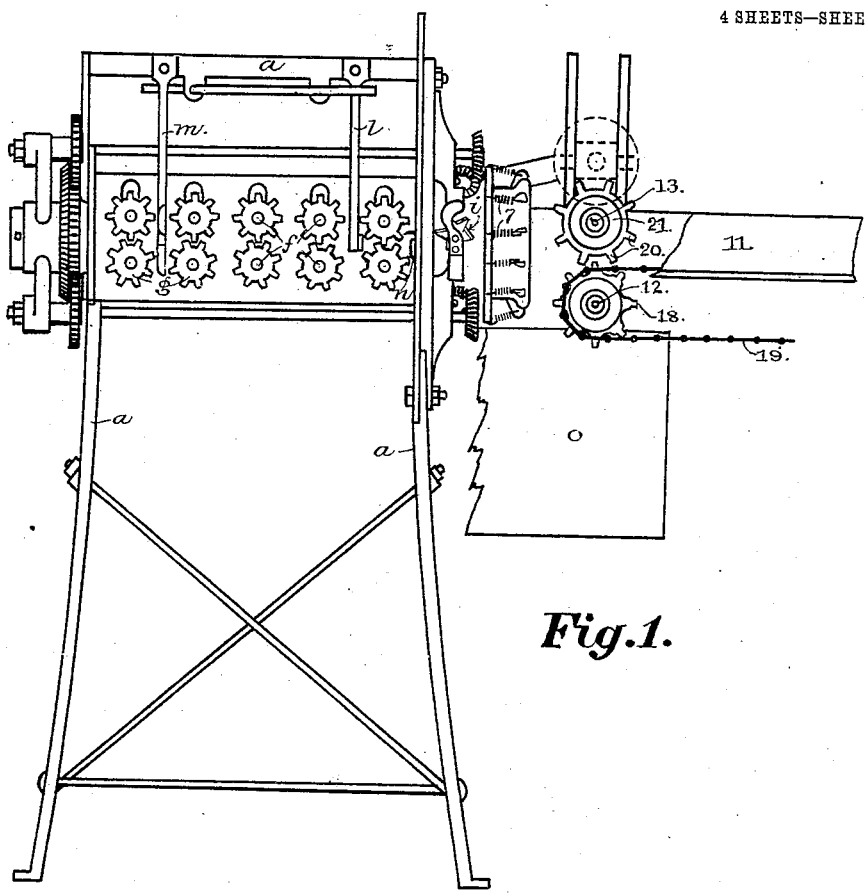

F. W. SMITH.
SLITTER FOR CORN CUTTERS.
APPLICATION FILED FEB. 19, 1909.

969,210.

Patented Sept. 6, 1910.

4 SHEETS—SHEET 1.

Witnesses:

Inventor.

F. W. SMITH.
SLITTER FOR CORN CUTTERS.
APPLICATION FILED FEB. 19, 1909.

969,210.

Patented Sept. 6, 1910.
4 SHEETS—SHEET 3.

Witnesses:

Inventor:
Frank W. Smith

F. W. SMITH.
SLITTER FOR CORN CUTTERS.
APPLICATION FILED FEB. 19, 1909.

969,210.

Patented Sept. 6, 1910.

4 SHEETS—SHEET 4.

Witnesses:

Inventor:

UNITED STATES PATENT OFFICE.

FRANK W. SMITH, OF PORTLAND, MAINE.

SLITTER FOR CORN-CUTTERS.

969,210.  Specification of Letters Patent.  Patented Sept. 6, 1910.

Application filed February 19, 1909. Serial No. 478,980.

*To all whom it may concern:*

Be it known that I, FRANK W. SMITH, a citizen of the United States of America, residing at Portland, in the county of Cumberland and State of Maine, have invented a Slitter for Corn-Cutters; and I hereby declare that the following is a full, clear, and exact description of the invention, which will enable others skilled in the art to which it appertains to make and use the same.

My invention relates to a slitting device or slitter for corn cutters.

Briefly it consists of a series of knives automatically adjustable and operated. These knives are carried in a frame in suitable slots therein provided, which frame may be attached to any of the ordinary corn cutters now in use with but slight changes therein. Not only my slitting device, but also parts of a corn cutter, which is extensively used, are shown in the drawing in which—

Figure 2:
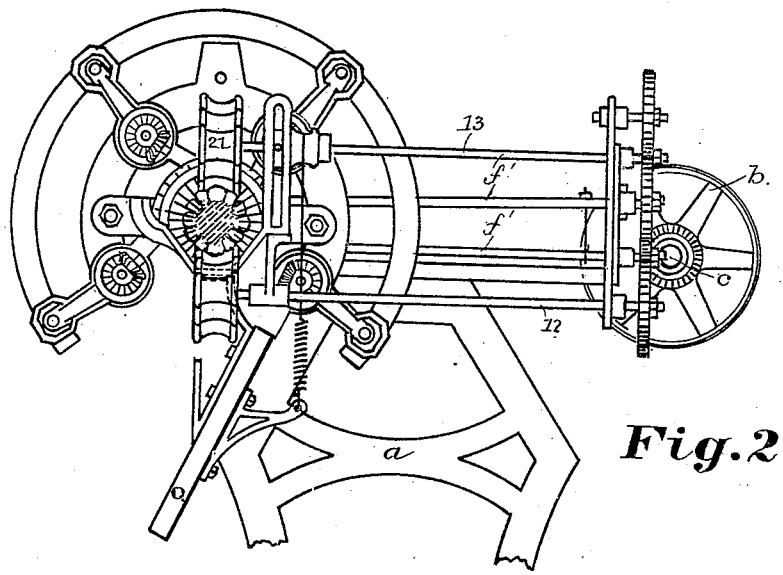
Figure 3:
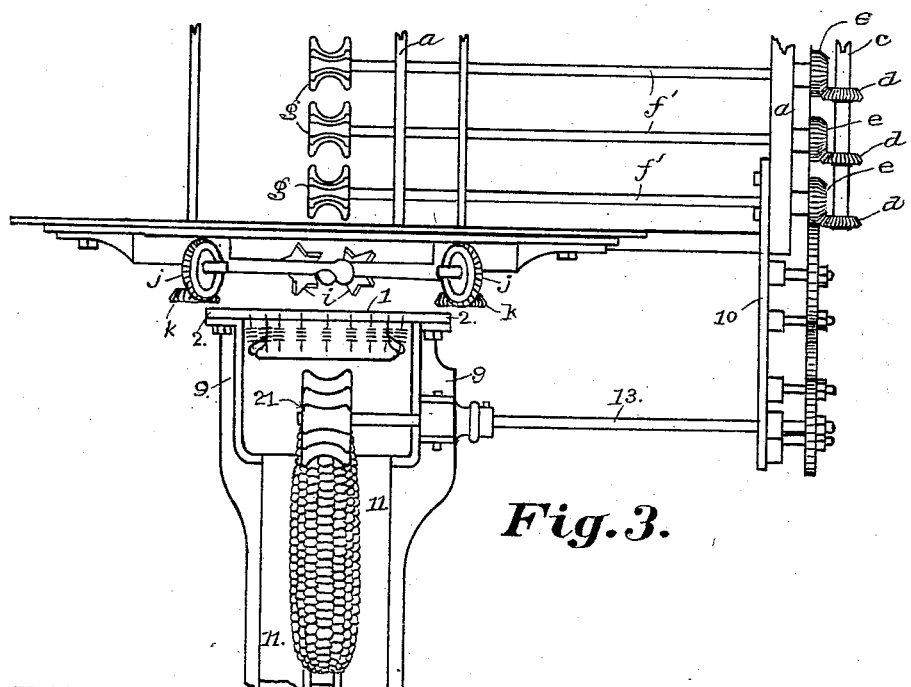
Figure 4:
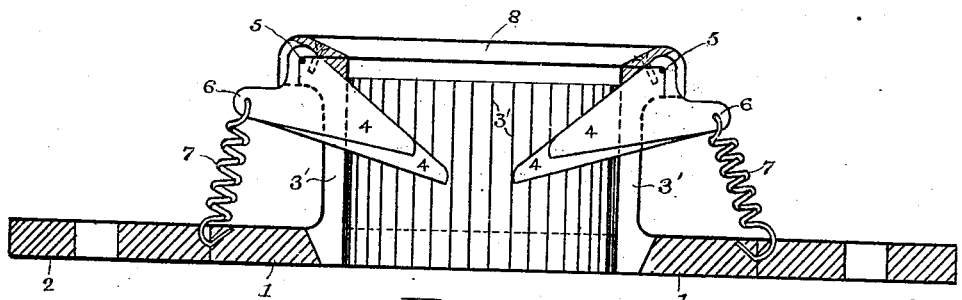
Figure 5:
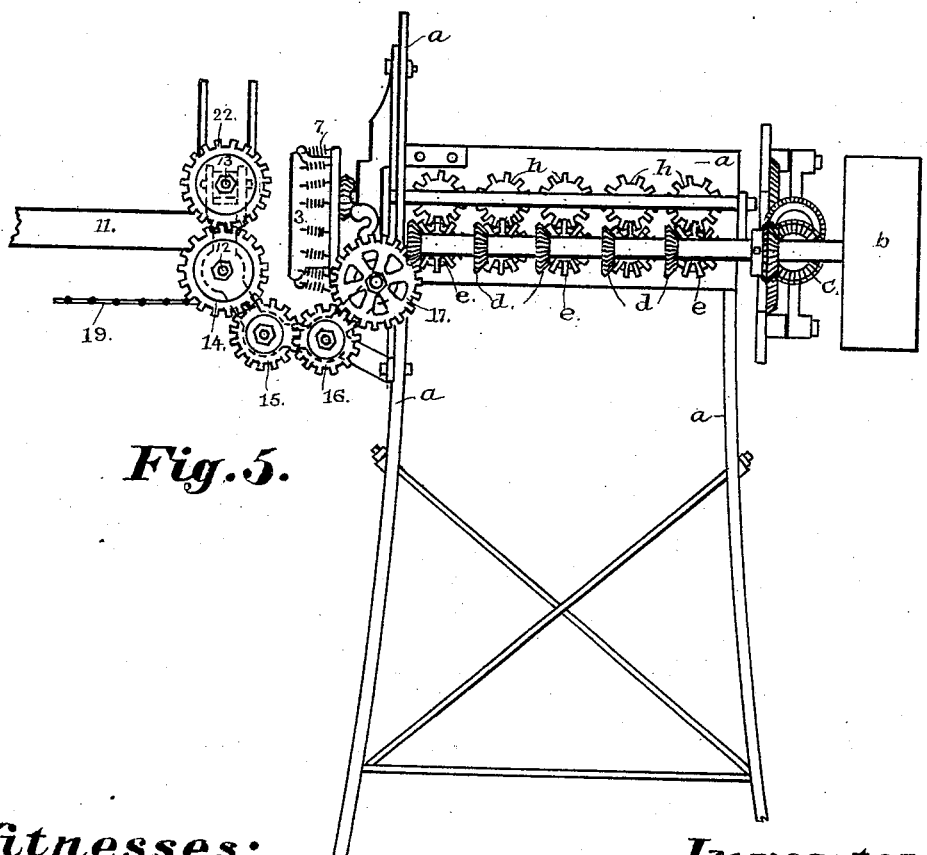
Figure 6:
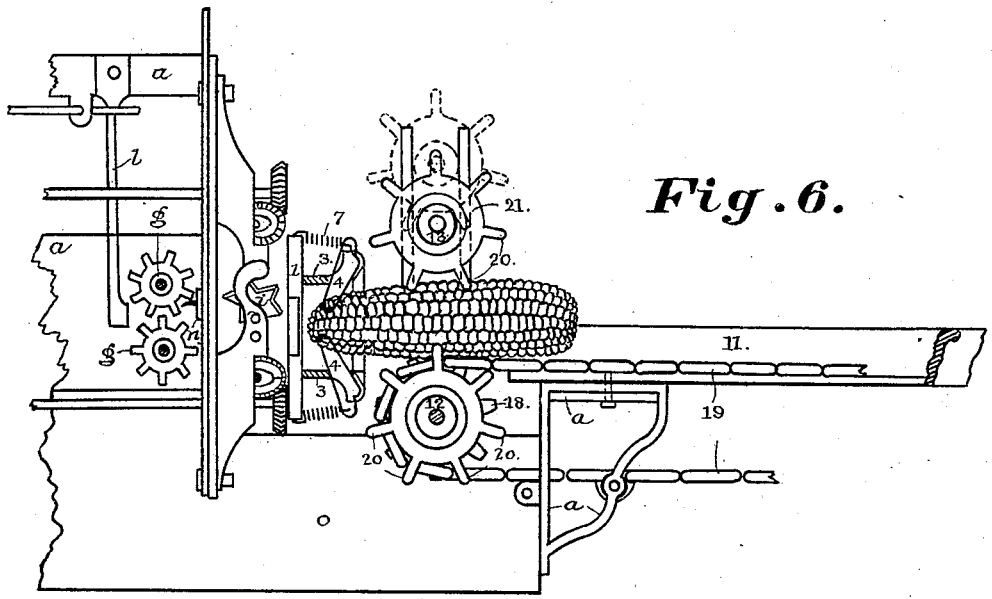
Figure 7:
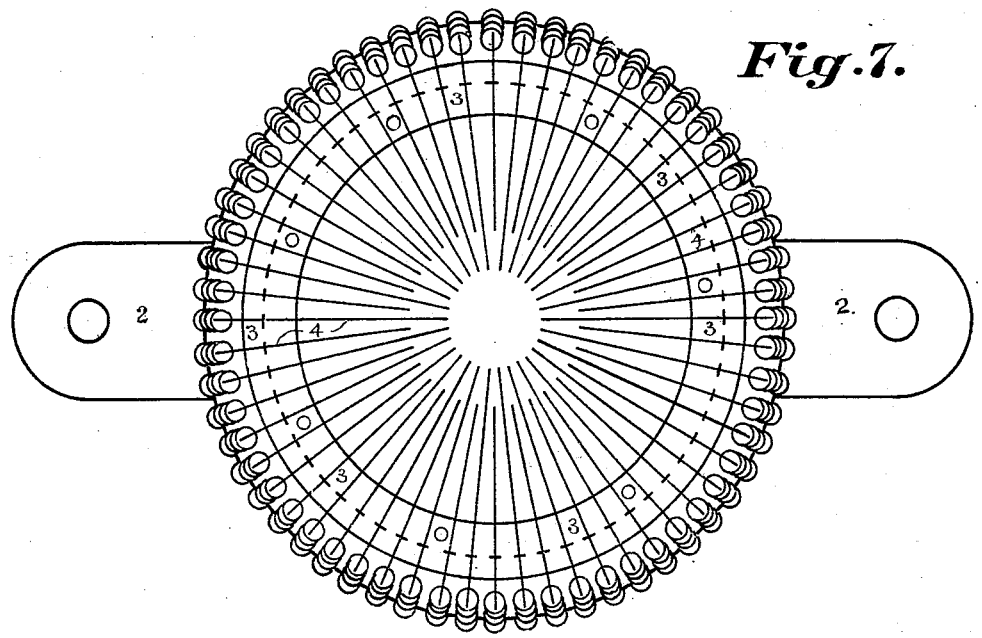

Figure 1 is a side elevation of such corn cutter with slitter attached: Fig. 2 is a detail showing in front elevation the means for operating the feed of the cutter, and my device: Fig. 3 is a top plan showing in detail the slitter and a portion of the feeding device of the cutter: Fig. 4 is a vertical transverse section of the slitter; showing four of the knives in position: Fig. 5 is an elevation of the side of the machine opposite that shown in Fig. 1 with the slitter attached: Fig. 6 is a detail showing in side elevation a portion of the cutter and the slitter attached thereto: Fig. 7 is a top plan of the slitter, the ring 8 being removed.

Briefly describing the corn cutter, it consists of the frame $a$ provided with a main pulley $b$ upon the shaft $c$ which carries the usual beveled gears $d$ $d$ which intermesh with combined beveled and plane gears $e$ $e$ carried upon appropriate transverse shafts $f$ $f$. The plane portion of the gears $e$ $e$ intermesh in turn with the plane gears $h$ $h$ carried upon the ends of the transverse shafts $f^1$ $f^1$, which are located directly above those before referred to. All these transverse shafts carry at their other ends feed rolls $g$, constituting with the star wheels $i$ $i$, which are placed directly in front of the feed rolls $g$ $g$, and are operated by the beveled gears $j$ $k$, the feeding mechanism of the corn cutter. The knives are carried by the horizontal and vertical knife arms $n$ and $l$ respectively. Ordinarily the cutter is provided in front with a trough, through which the corn is carried by an endless belt or chain to the star wheels $i$ $i$. The position occupied by such trough is occupied by my device when attached to the cutter. In attaching my device to the corn cutter, it is attached to a frame which is provided with a trough, with means for attachment to the frame of the corn cutter and with means for imparting power to the feed of the slitter.

The slitter is shown in Figs. 4 and 7 in transverse section and in top plan, and in the other figures is shown in various views as attached to a corn cutter. The head which carries the knives of the slitter is shown in Figs. 4 and 7. It consists of a plate 1 1, having a central circular opening and preferably annular in form, provided with ears 2 2 (see Figs. 4 and 7). From the inner edge of the ring or opening of the plate extends the wall 3. The wall 3 is provided with equidistant slots $3^1$, (all radiating from a common center) which should be but very slightly wider than the knives 4 4 to be employed. The knives 4 4 are substantially of the shape shown in Fig. 4. They are there shown, and also in Fig. 7, as being alternately longer and shorter, but I do not confine myself to knives of unequal length, thus arranged, as the knives may be made of equal length. These knives are pivoted at the upper outer ends in the head at 5 5 (being points equidistant from the center) with their cutting edges facing away from the plate 2. Each of the knives is provided with an ear 6, to which is attached in any convenient method the spring 7, the lower end of which is attached to the plate 1 of the head. Practically the head may be cast in one piece or, as shown in Fig. 4, it may be provided with the ring 8 for convenience in pivoting the knives. The means employed for attaching the slitter to the frame $a$ of the cutter are shown in Figs. 1, 2, 3, 5 and 6. Referring particularly to Fig. 3, they may briefly be described as consisting of the frame 9 which is bolted to a portion of the frame $a$ (see Fig. 6) and of the plate 10, also bolted to a portion of the frame $a$ (see Fig. 3). At the rear of the frame 9 which is pivoted for the purpose is attached the plate 1 of the head of the slitter by means of bolts through the ears 2 2. The front portion of the frame is provided with the trough 11, an intervening space being left between the rim of the head and the forward end of the trough. There are also provided two shafts 12 and 13 (see Fig. 5). The shaft 12 carries the gear 14 which is driven by means of the intermeshing gears 15 and 16, which latter meshes with the gear 17, which in turn meshes with the plane portion of the combined gear *e*. The shaft 12 is provided with a sprocket wheel 18 (see Fig. 6) which drives the chain 19 which passes around an idler near the forward portion of the trough 11. The sprocket wheel 18 is provided on either side with outwardly extending fingers 20 (see Fig. 6). The shaft 13 which is located directly above the shaft 12 carries a feed roll 21, the shaft 13 being driven by the spur gear 22 (see Fig. 5), and being adjustable vertically (see Fig. 6).

In operation the ear of corn is placed within the trough 11 upon the sprocket chain 19, by which it is carried forward between the feed rolls 18 and 21, the upper feed roll 21 yielding sufficiently to adjust the space between the feed rolls 18 and 21 to the varying diameters of the ear. These feed rolls carry forward the ear into contact with the knives 4 4, which open sufficiently to allow the ear to be carried between them while effectually slitting the kernels longitudinally of the ear. While the ear is passing between the knives 4 4, the forward end is seized by the star feed *i* which continues the progress of the ear of corn toward and into the cutter where the kernels are cut from the ear in the usual manner. When the cob has passed completely between the knives 4 4, the springs 7 7, cause the knives to resume the position shown in Fig. 4, when they are ready for another ear.

What I claim is:

1. The combination of a circular collar provided longitudinally with equidistant slots, the planes of which radiate from a common center, knives pivoted within said slots, means whereby the rear portion of the cutting edge of each knife normally rests under tension against the end of said respective slots, substantially as described.

2. The combination of a circular collar provided longitudinally with equidistant slots, the planes of which radiate from a common center, knives pivoted within said slots, means whereby the rear portion of the cutting edge of each knife normally rests under tension against the end of said respective slots, together with means whereby an ear of corn may be fed between the cutting edges of said knives, all substantially as described.

In testimony whereof I claim the foregoing as my invention, I have hereunto set my hand this seventeenth day of February, A. D. 1909.

FRANK W. SMITH.

Signed in presence of—
Geo. E. Bird,
A. G. McPherson.